United States Patent
Xu et al.

(10) Patent No.: US 12,315,240 B2
(45) Date of Patent: May 27, 2025

(54) OBJECT RECOGNITION MODEL TRAINING METHOD, OBJECT RECOGNITION METHOD AND OBJECT RECOGNITION DEVICE

(71) Applicant: Hangzhou Ruisheng Software Co., Ltd., Zhejiang (CN)

(72) Inventors: Qingsong Xu, Zhejiang (CN); Qing Li, Zhejiang (CN)

(73) Assignee: Hangzhou Ruisheng Software Co., Ltd., Zhejiang (CN)

( * ) Notice: Subject to any disclaimer, the term of this patent is extended or adjusted under 35 U.S.C. 154(b) by 0 days.

(21) Appl. No.: 18/929,666

(22) Filed: Oct. 29, 2024

(65) Prior Publication Data
US 2025/0054290 A1    Feb. 13, 2025

Related U.S. Application Data

(63) Continuation of application No. PCT/CN2023/090318, filed on Apr. 24, 2023.

(30) Foreign Application Priority Data

Jun. 1, 2022 (CN) .......................... 202210616572.7

(51) Int. Cl.
*G06K 9/00* (2022.01)
*G06V 10/776* (2022.01)
(Continued)

(52) U.S. Cl.
CPC ............ *G06V 10/82* (2022.01); *G06V 10/776* (2022.01); *G06V 10/80* (2022.01)

(58) Field of Classification Search
CPC .......... G06N 3/08; G06N 20/00; G06N 3/045; G06N 3/084; G06N 7/01; G06N 20/20;
(Continued)

(56) References Cited

U.S. PATENT DOCUMENTS

2016/0234023 A1    8/2016    Mozer et al.
2019/0325259 A1    10/2019    Murphy
(Continued)

FOREIGN PATENT DOCUMENTS

CN    110956127    4/2020
CN    111476280    7/2020
(Continued)

OTHER PUBLICATIONS

Cai, G., Zhu, Y., Wu, Y. et al. A multimodal transformer to fuse images and metadata for skin disease classification. Vis Comput 39, 2781-2793, 2023 (Year: 2023).*
"International Search Report (Form PCT/ISA/210) of PCT/CN2023/090318", mailed on Jul. 20, 2023, with English translation thereof, pp. 1-5.
(Continued)

*Primary Examiner* — Alex Kok S Liew
(74) *Attorney, Agent, or Firm* — JCIPRNET (57) ABSTRACT

The disclosure relates to a training method of an object recognition model, an object recognition method, and an object recognition device. The training method includes: acquiring a training set, in which the training set includes a plurality of groups of input samples for training and marking results corresponding to the input samples, each input sample includes an object image and metadata, and the metadata is configured to describe a corresponding object image; on the basis of a neural network, training an object recognition model by using the training set; and ending the training when a training accuracy is greater than or equal to a preset accuracy, and obtaining a trained object recognition model.

18 Claims, 6 Drawing Sheets

(51) Int. Cl.
*G06V 10/80* (2022.01)
*G06V 10/82* (2022.01)

(58) Field of Classification Search
CPC .......... G06N 3/082; G06N 20/10; G06N 3/04; G06N 5/01; G06N 3/044; G06N 3/048; G06N 3/02; G06N 3/047; G06N 3/0464; G06N 3/09; G06N 5/02; G06N 5/025; G06N 3/0495; G06N 3/063; G06N 3/088; G06N 5/04; G06N 5/046; G06N 3/042; G06N 3/0455; G06N 3/096; G06N 3/10; G06N 3/126; G06N 3/0475; G06N 3/098; G06N 5/022; G06N 5/043; G06V 10/82; G06V 10/764; G06V 2201/03; G06V 10/454; G06V 10/774; G06V 30/1914; G06V 10/70; G06V 20/17; G06V 20/188; G06V 10/26; G06V 10/7715; G06V 10/945; G06V 30/2504; G06V 40/10; G06V 40/193; G06V 10/25; G06V 10/32
See application file for complete search history.

(56) References Cited

U.S. PATENT DOCUMENTS

2020/0005061 A1* 1/2020 Lu .......................... G06V 20/41
2021/0192293 A1   6/2021 Wiltshire

FOREIGN PATENT DOCUMENTS

| CN | 112016531 | 12/2020 |
|---|---|---|
| CN | 112257661 | 1/2021 |
| CN | 113359135 | 9/2021 |
| CN | 113705550 | 11/2021 |
| CN | 114120094 | 3/2022 |
| CN | 114998682 | 9/2022 |

OTHER PUBLICATIONS

"Written Opinion of the International Searching Authority (Form PCT/ISA/237) of PCT/CN2023/090318", mailed on Jul. 20, 2023, pp. 1-4.
"Office Action of China Counterpart Application", issued on Apr. 11, 2025, p. 1-p. 9.

* cited by examiner

OBJECT RECOGNITION MODEL TRAINING METHOD, OBJECT RECOGNITION METHOD AND OBJECT RECOGNITION DEVICE

CROSS-REFERENCE TO RELATED APPLICATION

This application is a continuation of international application of PCT application serial no. PCT/CN2023/090318, filed on Apr. 24, 2023, which claims the priority benefit of China application no. 202210616572.7, filed on Jun. 1, 2022. The entirety of each of the above-mentioned patent applications is hereby incorporated by reference herein and made a part of this specification.

BACKGROUND

Technical Field

The disclosure relates to the field of computer technology, and particularly relates to an object recognition model training method, an object recognition method, and an object recognition device.

Description of Related Art

In order to recognize various objects such as plants and insects, a user may provide the captured object image and use the pre-trained object recognition model to complete the recognition, thereby obtaining the recognition result such as species information. However, the accuracy of the current object recognition model is still relatively low, so there is a need for an improved object recognition model.

SUMMARY

One of the purposes of the disclosure is to provide an object recognition model training method, an object recognition method, and an object recognition device.

According to the first aspect of the disclosure, an object recognition model training method is proposed, and the training method includes:
  acquiring a training set, in which the training set includes multiple groups of input samples for training and marking results corresponding to the input samples, each input sample includes an object image and metadata, and the metadata is configured to describe the corresponding object image;
  training the object recognition model by using the training set based on a neural network; and
  ending training in response to a training accuracy being greater than or equal to a preset accuracy, and obtaining a trained object recognition model.

In some embodiments, before training the object recognition model by using the training set based on the neural network, the training method further includes: normalizing the metadata.

In some embodiments, the metadata includes at least one of a geographical shooting location, a shooting time, a shooting scene, an object part, and an object state of the object image.

In some embodiments, the neural network includes a classifier component and at least one block, and the at least one block includes a first block,
  training the object recognition model by using the training set based on the neural network includes:
    generating a first image feature vector based on the object image through the first block;
    generating a first embedding feature vector based on the metadata;
    fusing the first image feature vector with the first embedding feature vector to generate a first fused feature vector; and
    generating a classification result according to the first fused feature vector through the classifier component to train the object recognition model.

In some embodiments, generating the first embedding feature vector based on the metadata includes:
  generating the first embedding feature vector based on the metadata through at least one fully connected layer.

In some embodiments, generating the first embedding feature vector based on metadata includes:
  generating the first embedding feature vector based on the metadata through the at least one fully connected layer and at least one linear rectification layer.

In some embodiments, the dimension of the first image feature vector is the same as the dimension of the first embedding feature vector.

In some embodiments, fusing the first image feature vector with the first embedding feature vector to generate the first fused feature vector includes:
  adding each image vector component in the first image feature vector to the corresponding embedding vector component in the first embedding feature vector to generate each fused vector component in the first fused feature vector.

In some embodiments, fusing the first image feature vector with the first embedding feature vector to generate the first fused feature vector includes:
  concatenating the first image feature vector with the first embedding feature vector in a preset dimension to generate the first fused feature vector.

In some embodiments, the at least one block further includes a second block connected in series with the first block,
  generating the first image feature vector based on the object image through the first block includes:
    generating a second image feature vector based on the object image through the second block;
    generating a second embedding feature vector based on the metadata;
    fusing the second image feature vector with the second embedding feature vector to generate a second fused feature vector; and
    generating the first image feature vector according to the second fused feature vector through the first block.

In some embodiments, the neural network further includes a preprocessing component,
  training the object recognition model by using the training set based on the neural network includes:
    generating a preprocessed image based on the object image through the preprocessing component, and the preprocessed image is used as an input of a block adjacent to the preprocessing component in the at least one block.

In some embodiments, the training method further includes:
  acquiring a test set, wherein the test set comprises a plurality of groups of input samples for testing and marking results corresponding to the input samples, each of the input samples comprises an object image and metadata, the metadata is configured to describe the corresponding object image, and the test set is different from the training set;

using the test set to determine a model accuracy of the trained object recognition model; and retraining the object recognition model in response to the model accuracy being less than the preset accuracy.

In some embodiments, the neural network includes a residual neural network.

According to the second aspect of the disclosure, an object recognition method is provided, and the object recognition method includes:

acquiring an object image to be recognized and metadata, wherein the metadata is configured to describe the object image to be recognized;

determining a recognition result based on the object image and the metadata by using an object recognition model, in which the object recognition model is obtained by training using the training method described above.

According to the third aspect of the disclosure, an object recognition device is provided. The object recognition device includes a memory and a processor. The memory stores a command. When the command is executed by the processor, the training method or the object recognition method described above is implemented.

According to the fourth aspect of the disclosure, a computer-readable storage medium is provided. The computer-readable storage medium stores a command. When the command is executed by a processor, the training method or the object recognition method described above is implemented.

According to the fifth aspect of the disclosure, a computer program product is provided. The computer program product includes commands. When the command is executed by a processor, the training method or the object recognition method as described above is implemented.

Other features and advantages of the disclosure will become more comprehensible from the following detailed description of exemplary embodiments of the disclosure with reference to the accompanying drawings.

BRIEF DESCRIPTION OF THE DRAWINGS

The accompanying drawings, which constitute a part of the specification, illustrate embodiments of the disclosure and, together with the description, serve to explain the principles of the disclosure.

The disclosure may be more clearly understood from the following detailed description with reference to the accompanying drawings, in which.

It should be noted that in the embodiments described below, the same reference numerals may be used among different drawings to indicate the same parts or parts having the same functions, and the repeated descriptions thereof may be omitted. In some cases, similar reference numbers and letters are used to denote similar items, and thus, once an item is defined in a drawing, then further discussion of the item is not necessary in subsequent drawings.

For ease of understanding, the position, size, range, etc. of each structure shown in the drawings and the like may not represent the actual position, size, range, etc. Therefore, the disclosure is not limited to the position, size, range, etc. disclosed in the drawings and the like.

DESCRIPTION OF THE EMBODIMENTS

Various exemplary embodiments of the disclosure will be described in detail below with reference to the accompanying drawings. It should be noted that the relative arrangement of components and steps, the numerical expressions, and numerical values set forth in the embodiments do not limit the scope of the disclosure unless specifically stated otherwise.

The following description of at least one exemplary embodiment is merely illustrative in nature and is in no way intended to limit the disclosure, the application thereof, or the uses. That is, the structures and methods herein are shown in an exemplary manner to illustrate different embodiments of the structures and methods in the disclosure. However, persons skilled in the art will appreciate that the embodiments are merely illustrative of exemplary ways in which the disclosure may be implemented, and not exhaustive. Furthermore, the drawings are not necessarily drawn to scale, and some features may be enlarged to show details of particular components.

Technologies, methods, and apparatus known to ordinary technicians in the relevant field may not be discussed in detail, but where appropriate, such technologies, methods, and apparatus should be considered part of the authorization specification.

In all examples shown and discussed herein, any specific values should be interpreted as merely exemplary and not as limiting. Therefore, other examples of the exemplary embodiments may have different values.

Figure 1:
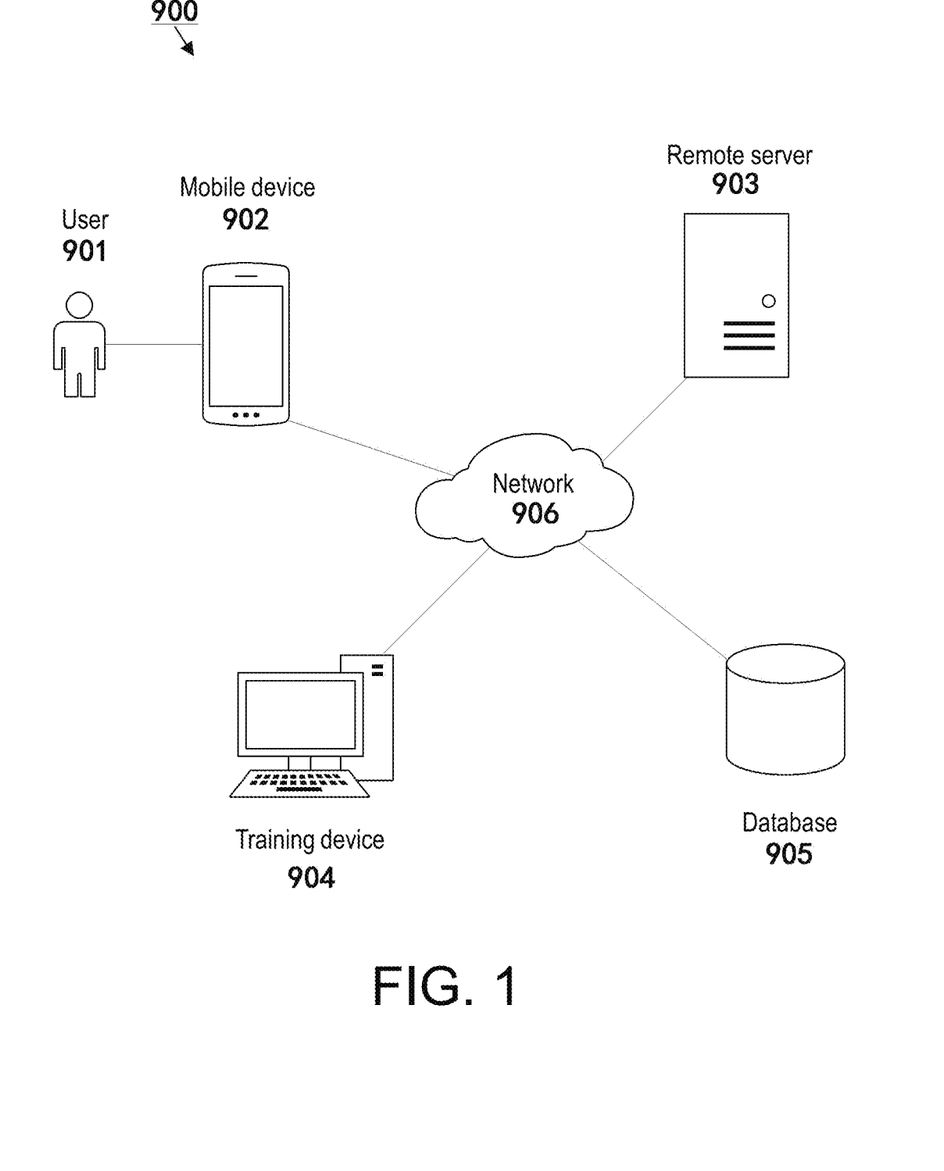
FIG. 1 shows a schematic diagram of a network environment according to an exemplary embodiment of the disclosure.

FIG. 1 shows a schematic diagram of a network environment 900 according to an exemplary embodiment of the disclosure. The network environment 900 may include a mobile device 902, a remote server 903, a training device 904, and a database 905, which are coupled to each other in a wired or wireless manner via a network 906. The network 906 may be implemented as a wide area network (such as a mobile phone network, a public switched telephone network, a satellite network, or the Internet), a local area network (such as Wi-Fi, Wi-Max, ZigBee™, or Bluetooth™), and/or other forms of networking functionality.

The mobile device 902 may be a mobile phone, a tablet computer, a laptop computer, a personal digital assistant, and/or other computing device configured to capture, store, and/or transmit images, such as digital photographs. Therefore, the mobile device 902 may include an image acquisition unit such as a digital camera and/or may be configured to receive images from other devices. The mobile device 902 may include a display. The display may be configured to provide one or more user interfaces to a user 901, in which the user interface may include a plurality of interface elements, and the user 901 may, for example, interact with the interface elements. For example, the user 901 may use the mobile device 902 to take photos of objects such as plants and insects and upload or store the object image. The mobile device 902 can output species information of objects such as plants and insects to the user.

The remote server 903 may be configured to analyze, for example, the object image received from the mobile device 902 via the network 906 to determine, for example, the type of the object, such as for executing an object recognition method described below. The remote server 903 may further be configured to build and train an object recognition model as described below.

A training device 904 may be coupled to the network 906 to facilitate training of the object recognition model, such as for executing an object recognition model training method as described below. The training device 904 may have multiple CPUs and/or GPUs to assist in training the object recognition model. The specific training process will be described in detail below.

The database 905 may be coupled to the network 906 and provide data required by the remote server 903 to perform relevant calculations. The database 905 may be implemented using various database technologies known in the art. The remote server 903 may access the database 905 as needed to perform relevant operations.

It should be understood that the network environment in the document is just an example. Persons skilled in the art may add more devices or delete some devices as needed, and may modify the functions and configurations of some devices.

In some examples, an object recognition model can be trained and built based on a neural network. The training process is as follows.

A certain number of object images marked with marking results are acquired for each object type. The number of object images prepared for each object type may be equal or different. The marking result marked for each object image may include the name of the object in the object image (including, for example, scientific name, alias, and category name of biological classification). The object image acquired for each object type may include images of the object of the type, for example, at different geographical shooting locations, different shooting times, different shooting scenes, different object parts, and different object states.

The object images marked as described above are divided into a training set for training an object recognition model and a test set for testing a training result. Usually the number of samples in the training set is significantly larger than the number of samples in the test set. For example, the number of samples in the test set accounts for 5% to 20% of the total number of samples, while the number of samples in the corresponding training set accounts for 80% to 95% of the total number of samples. Persons skilled in the art should understand that the number of samples in the training set and the test set may be adjusted as needed.

The training set is used to train the neural network until a preset accuracy is reached. In some cases, the test set may also be used to test the model accuracy of the trained neural network as needed. If the model accuracy does not meet the requirements, the number of samples in the training set is increased and the updated training set is used to retrain the neural network until the model accuracy of the trained neural network meets the requirements.

The neural network may include, for example, a convolutional neural network (CNN) or a residual neural network (Resnet). In the embodiment, the convolutional neural network is a deep feedforward neural network, which uses a convolution kernel to scan the object image, extracts the features to be recognized in the object image, and then recognizes the features to be recognized of the object. In addition, in the process of recognizing the object image, the original object image may be directly input into the convolutional neural network model without preprocessing the object image. Compared with other recognition models, the convolutional neural network model has higher recognition accuracy and efficiency. Compared with the convolutional neural network model, the residual neural network model is added with an identity mapping layer, which can avoid the phenomenon that the accuracy of the convolutional neural network is saturated or even decreased as the network (the number of layers in the network) increases. The identity mapping function of the identity mapping layer in the residual neural network model needs to satisfy: the sum of the identity mapping function and the input of the residual neural network model is equal to the output of the residual neural network model. After introducing the identity mapping, the changes in output of the residual neural network model are more obvious, thereby greatly improving the accuracy and efficiency of object recognition. In the specific examples below, the neural network will be described in detail by taking a residual neural network as an example. However, it should be understood that other types of neural networks may also be used for training without departing from the concept of the disclosure.

Figure 2:
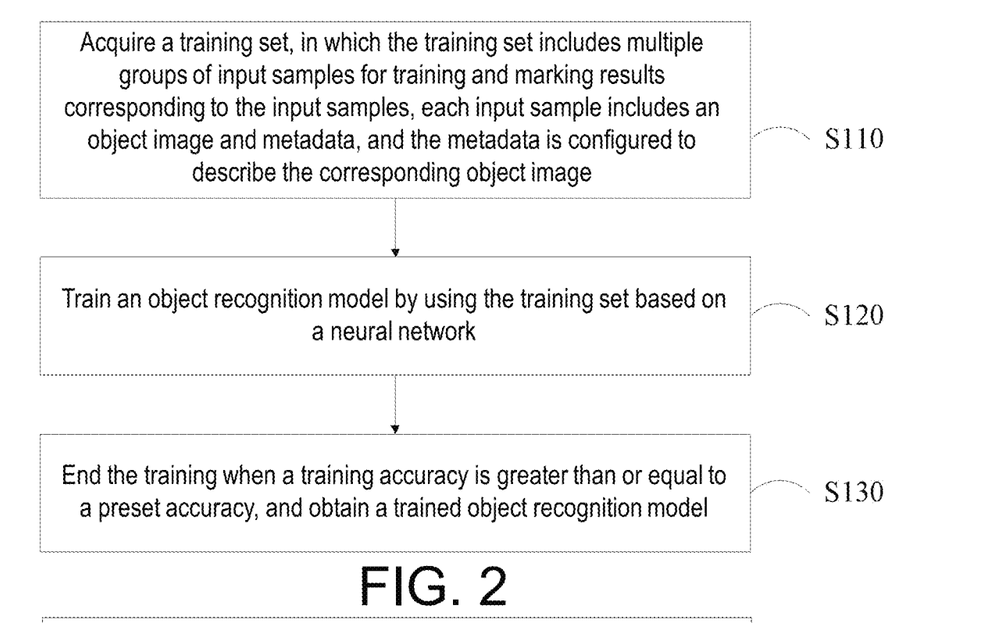
FIG. 2 shows a flow chart of an object recognition model training method according to an exemplary embodiment of the disclosure.

As described above, when training the object recognition model, generally, the training is only based on the object image, for example, the RGB data of the object image is input into the neural network for training, which often leads to a lower recognition accuracy. In order to improve the accuracy of the object recognition model, the disclosure proposes an object recognition model training method, which trains the object recognition model not only based on the object image, but also based on metadata configured to describe the object image, so as to improve the recognition accuracy and recognition efficiency. As shown in FIG. 2, in an exemplary embodiment of the disclosure, the training method may include:

the step S110. A training set is acquired, in which the training set includes multiple groups of input samples for training and marking results corresponding to the input samples, each input sample includes an object image and metadata, and the metadata is configured to describe the corresponding object image.

In the embodiment, the object image may include photos and videos of objects such as plants and insects taken by a user. The object image may be in RGB format, for example. Each pixel in the object image may be formed by three color components: red (R), green (G), and blue (B). It should be understood that other data formats may also be used to represent the object image, such as RGBA format, or HSV format.

The Metadata is data used to describe the object image. Each object image may have corresponding metadata. In some embodiments, the metadata may include at least one of the geographical shooting location, the shooting time, the shooting scene, the object part, and the object state of the object image. In the embodiment, the shooting scene may be used to describe the environment when shooting the subject, such as whether the scene is indoors or outdoors; the object part may be used to describe the object part presented or mainly presented in the object image, such as the root, the stem, the leaf, the flower, the fruits of plants, or the head or the abdomen of insects; the object state may be used to describe the current stage of the object presented in the object image, such as the seedling stage, flowering stage, fruiting stage of plants, or the larval stage, the adult stage of insects. It should be understood that in some other embodiments, the metadata may also include other data used to describe the object image, and the disclosure is not limited thereto. When training the object recognition model, all metadata may be involved in the training process; alternatively, a portion of metadata that plays a key role in object recognition may be selected for training, so as to improve the accuracy of the model while maintaining high training efficiency and avoid wasting training resources.

In some embodiments, to facilitate data processing during training, the training method may further include normalizing the metadata, thereby limiting the value range of the metadata to a desired range, for example, making the absolute value of the metadata between 0 and 1 (including 0 and 1), to improve the training result. It should be understood that the value range of the metadata may be adjusted as needed according to the role played by specific metadata in recognition and the relationship between the metadata and the object image, and the disclosure is not limited thereto. In addition, different normalization methods may be used based on different types of metadata.

For example, when the metadata is the geographical shooting location of the object image, the shooting location may usually be represented by longitude and latitude. Then, in the process of normalizing the geographical shooting location, the sine function and the cosine function may be used to convert the longitude and latitude into values with absolute values between 0 and 1. In a specific example, if a certain geographical shooting location may be represented as (L1, L2), in which, L1 is the longitude (expressed as an angle) of the geographical shooting location, and L2 is the latitude (expressed as an angle) of the geographical shooting location, then, the normalized geographical shooting location may be expressed as $(\sin(\pi L1/180), \cos(\pi L1/180), \sin(\pi L2/180), \cos(\pi L2/180))$, that is, a vector with a dimension of 4 may be used to uniquely represent a specific geographical shooting location.

When the metadata is the shooting time of the object image, the shooting time may be divided into two parts: the shooting date and the shooting time on that day, and the shooting time is converted into the form of universal standard (UTC) time. Then, the shooting date and shooting time are respectively represented in a normalized manner. In a specific example, the shooting time may be expressed as $(\sin(2\pi d/Y), \cos(2\pi d/Y), \sin(2\pi t/D), \cos(2\pi t/D))$, in which d means the current shooting date is the dth day of the year, Y means the total number of days in a year (365 or 366), t means the current shooting time is the t-th time of the day, and D represents the total number of time units in a day (for example, 24 when the time unit is accurate to the hour), that is, a vector with a dimension of 4 may also be used to uniquely represent a specific shooting time.

In summary, when the metadata is a quantity that can take continuous values, the sine function and the cosine function may be used to normalize the metadata. However, it should be understood that other functions may also be used to achieve normalization of the metadata that can take continuous values, and the disclosure is not limited thereto.

When the metadata is one of the shooting scene, the object part, and the object state of the object image, or when the metadata is a discrete quantity, a "dictionary lookup" method may be used to determine the value of the metadata. For example, when the metadata represents various parts of a plant, 1 may represent the root part of the plant, 2 may represent the stem part of the plant, 3 may represent the leaf part of the plant, 4 may represent the flower part of the plant, and 5 may represent the fruit part of the plant. In this way, the object part may be encoded as a [5,x] matrix, where 5 corresponds to 5 categories, that is, each category corresponds to a vector of x values. After encoding the object part, the object state, and other metadata respectively, a [n,x] vector is obtained, and n is the number of such discrete features.

During the training process, various metadata may be combined together, for example, vectors may be formed based on the various metadata respectively, and then the vectors are added together for fusion. For example, the vectors of the various metadata may be converted into vectors of a preset dimension (for example, 2048) through several (for example, 3) fully connected layers, and then corresponding components of the vectors may be added together to obtain a vector representing all metadata involved in the training.

Returning to FIG. 2, in an exemplary embodiment of the disclosure, the training method may further include the following.

In the step S120, based on the neural network, the object recognition model is trained by using the training set.

As mentioned above, since the input sample of the training set contains the object image and the metadata thereof, it is helpful to improve the accuracy of the trained object recognition model. For neural networks with different structures, metadata may be embedded into the training process in different ways.

Figure 3:
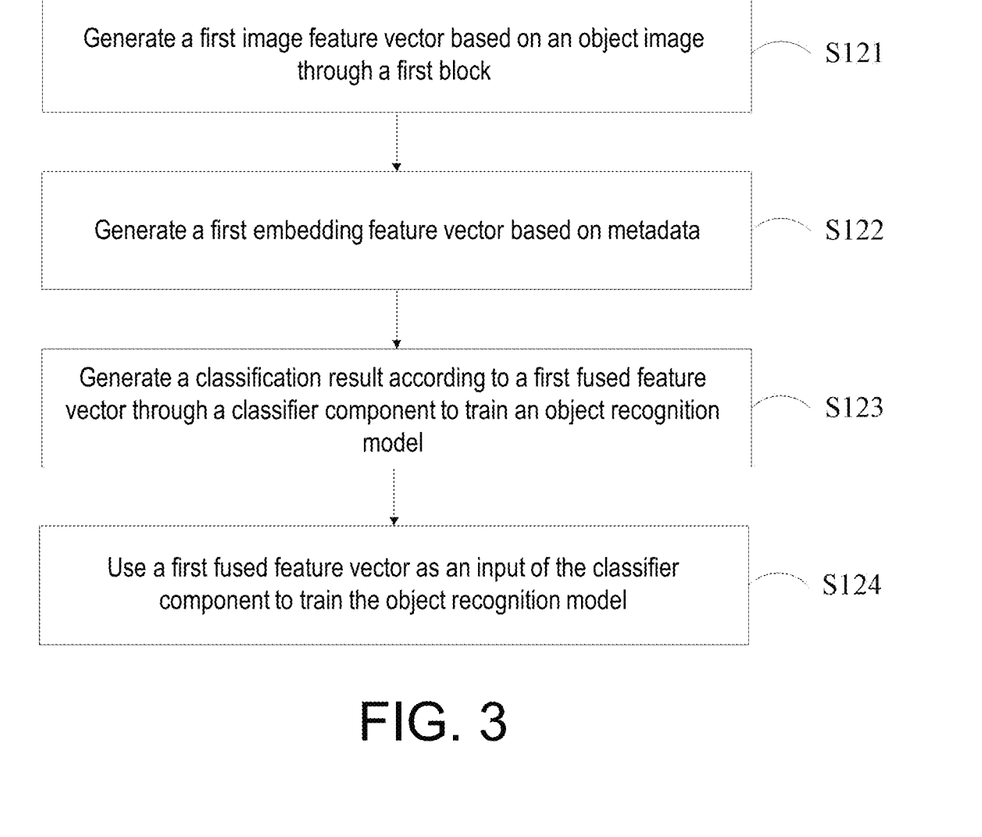
FIG. 3 shows a flow chart of step S120 of a training method according to an exemplary embodiment of the disclosure.
Figure 4:
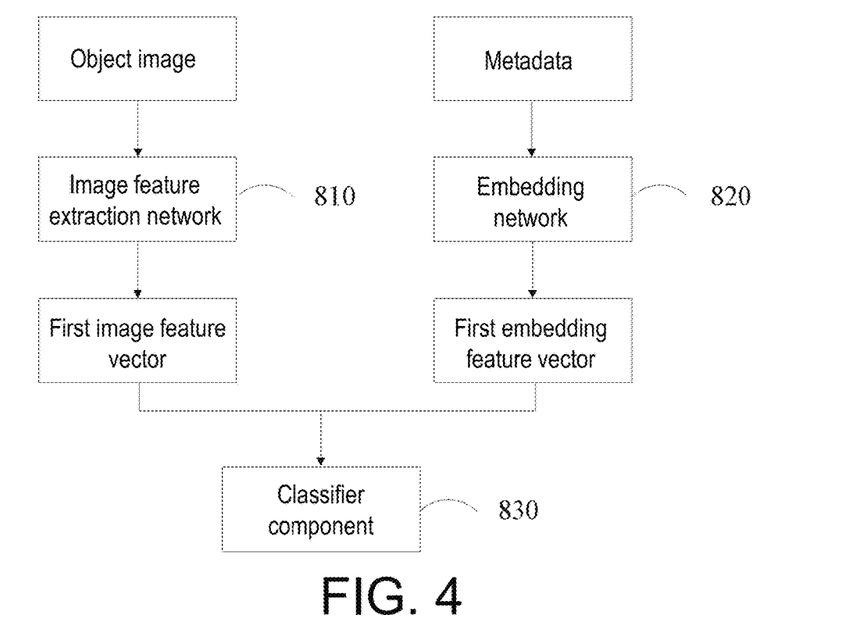
FIG. 4 shows a schematic diagram of the training method according to a specific example of the disclosure.

In some embodiments, as shown in FIG. 3 and FIG. 4, the neural network may include a classifier component 830 and at least one block, the at least one block is included in an image feature extraction network 810, and the at least one block may include the first block. Accordingly, based on the neural network, training the object recognition model by using the training set may include the following.

In the step S121, the first image feature vector is generated based on the object image through the first block.

In the step S122, the first embedding feature vector is generated based on the metadata.

In the step S123, the first image feature vector is fused with the first embedding feature vector to generate the first fused feature vector.

In the In step S124, a classification result is generated according to the first fused feature vector through the classifier component to train an object recognition model.

In a specific example, the first block may be a block adjacent to the classifier component 830 in the image feature extraction network 810. That is, during the training process, the object image is converted into the first image feature vector through the complete image feature extraction network 810 (for example, the network backbone in the residual neural network is converted into the first image feature vector, the metadata is converted into the first embedding feature vector through the embedding network 820, and then the first image feature vector is fused with the first embedding feature vector to generate the first fused feature vector (not shown in the drawing)), and the generated first fused feature vector is input into the classifier component 830 to generate a classification result. In such an example, the image feature extraction network 810 and the embedding network 820 are independent of each other, and only before the final classification, the first image feature vector and the first embedding feature vector are fused.

In some embodiments, the embedding network 820 may include at least one fully connected layer. Accordingly, generating the first embedding feature vector based on the metadata may include generating the first embedding feature vector based on the metadata through the at least one fully connected layer.

In some other embodiments, the embedding network 820 may further include at least one linear rectification layer. Accordingly, generating the first embedding feature vector based on the metadata may include generating the first embedding feature vector based on the metadata through the at least one fully connected layer and the at least one linear rectification layer.

In addition, there are various ways to fuse the first image feature vector and the first embedding feature vector. In some embodiments, the dimension of the first image feature vector may be the same as the dimension of the first embedding feature vector. Thus, fusing the first image feature vector with the first embedding feature vector to generate the first fused feature vector may include adding each image vector component in the first image feature vector to a corresponding embedding vector component in the first embedding feature vector, respectively, to generate each fused vector component in the first fused feature vector, and the dimension of the generated first fused feature vector remains the same as the dimension of the first image feature vector or the dimension of the first embedding feature vector. For example, if the dimension of the first image feature vector A is [ax, ay], and the dimension of the first embedding feature vector B is [bx, by], then if A and B are added together to obtain the first fused feature vector C, the dimension thereof is [ax, ay], in which it is required that ax=bx, and ay=by. In this case, the dimension of the generated first fused feature vector remains unchanged, so there is no need to adjust the subsequent network structure, thereby preserving the integrity of the main network architecture.

In some other embodiments, fusing the first image feature vector with the first embedding feature vector to generate the first fused feature vector may include concatenating the first image feature vector with the first embedding feature vector in a preset dimension to generate the first fused feature vector. For example, if the dimension of the first image feature vector A is [ax, ay], and the dimension of the first embedding feature vector B is [bx, by], then if A and B are concatenated in the first dimension, then the first fused feature vector C is obtained, the dimension thereof is [ax+bx, ay], in which it is required that ay=by. In this case, some corresponding adjustments to the network structure may be involved in subsequent training because the dimension of the first fused feature vector has changed, but at this time, it is not required that the dimension of the first image feature vector has to be the same as the dimension of the first embedding feature vector.

Figure 5:
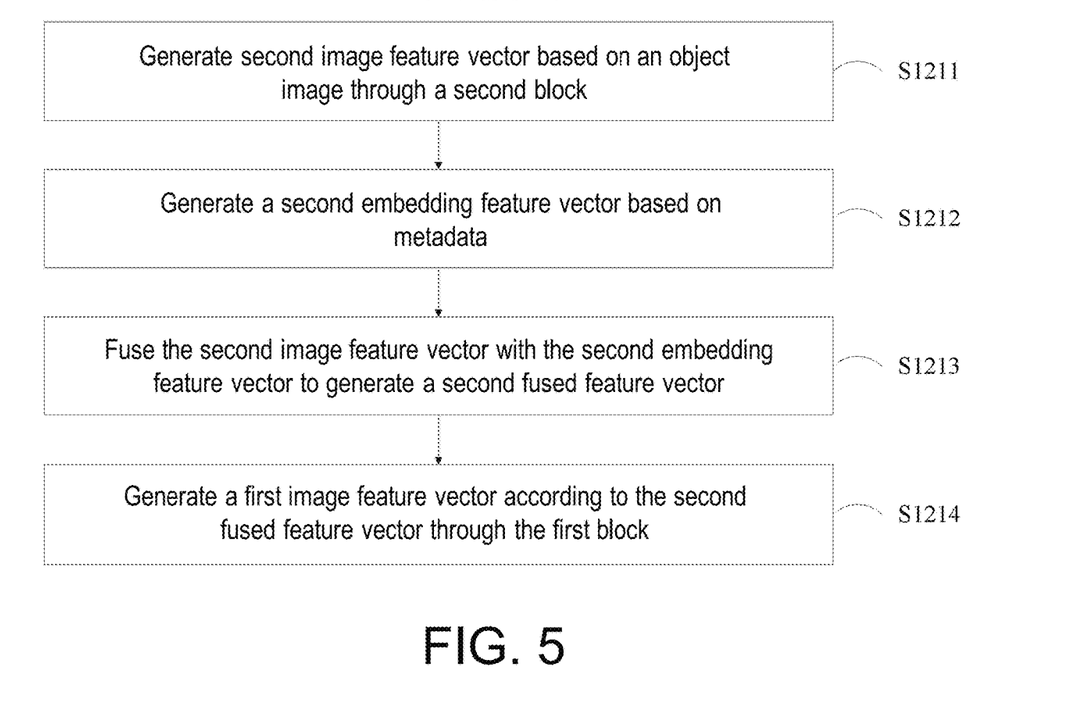
FIG. 5 shows a flow chart of step S121 of the training method according to an exemplary embodiment of the disclosure.
Figure 6:
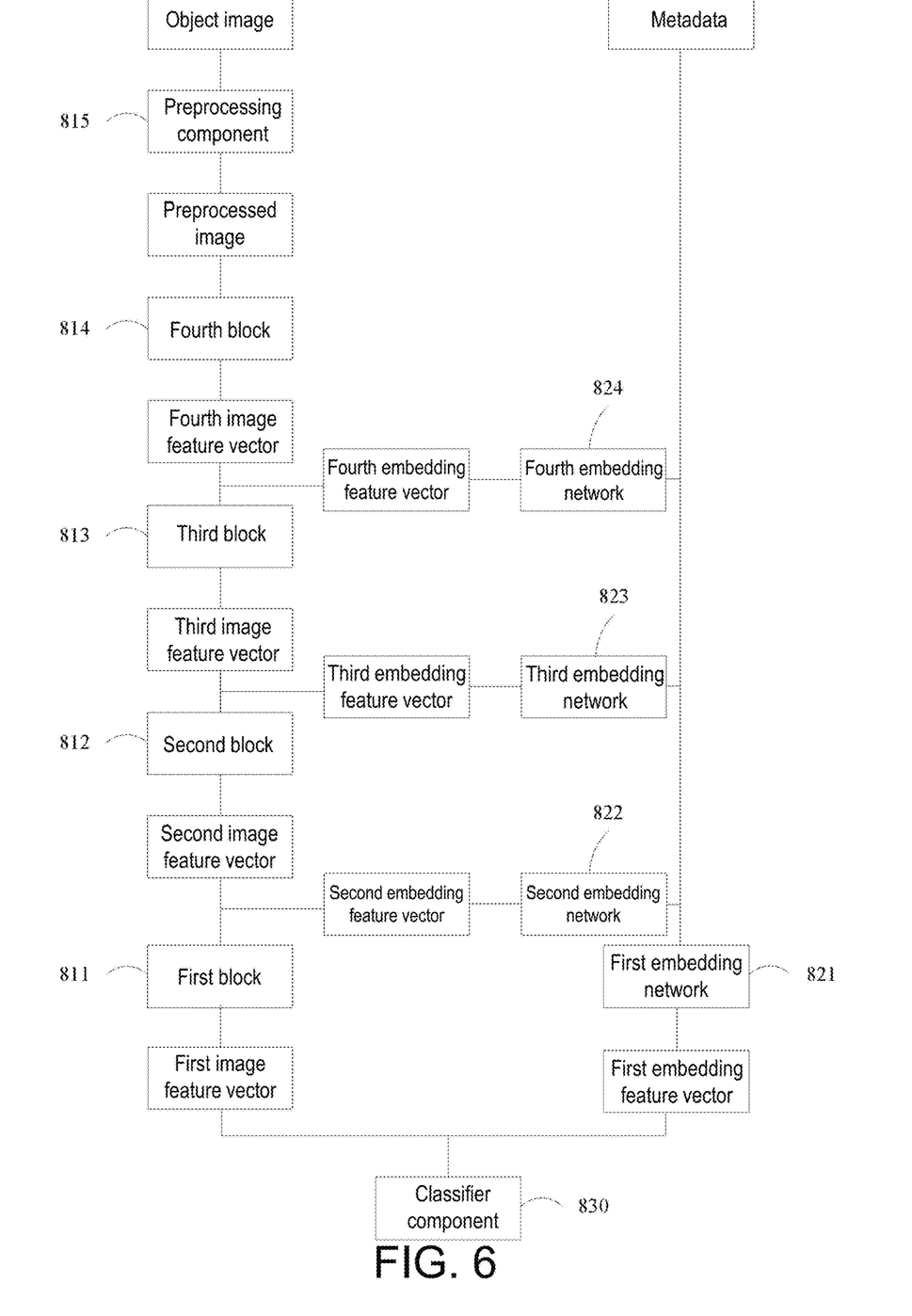
FIG. 6 shows a schematic diagram of the training method according to another specific example of the disclosure.

In some other embodiments, the image feature extraction network 810 and the embedding network 820 may not be entirely independent, and the input of a certain block may be a fused feature vector generated by fusing the image feature vector generated by another block above with the corresponding embedding feature vector. In other words, the embedding network may be partially embedded into the image feature extraction network, inserting the metadata at various stages to enhance the extracted features, in which each embedding network may be regarded as an independent embedding network. Specifically, as shown in FIG. 5 and FIG. 6, the at least one block may further include a second block 812 connected in series with the first block 811. Among them, each block shown in FIG. 6 is included in the image feature extraction network 810. Accordingly, generating the first image feature vector based on the object image through the first block may include the following.

In the step S1211, the second image feature vector is generated based on the object image through the second block.

In the step S1212, the second embedding feature vector is generated based on the metadata.

In the step S1213, the second image feature vector is fused with the second embedding feature vector to generate a second fused feature vector.

In the step S1214, the first image feature vector is generated according to the second fused feature vector through the first block.

Similarly, the second embedding feature vector may be generated based on the metadata in the manner of forming the first embedding feature vector, and the second fused feature vector may be generated according to the second image feature vector and the second embedding feature vector in the manner of forming the first fused feature vector. Similarly, the image feature vector and the embedding feature vector may be fused at more blocks, and the generated fused feature vector may be used as the input of the next level block to improve the training effect.

In addition, as shown in FIG. 6, in some embodiments, the neural network may further include a preprocessing component 815 (stem), and the preprocessing component 815 is also included in the backbone. Accordingly, based on the neural network, training the object recognition model by using the training set may include: a preprocessed image is generated based on the object image through the preprocessing component, and the preprocessed image is used as an input of a block adjacent to the preprocessing component in at least one block. For the specific settings of the preprocessing component and the block, reference may be made to the settings in the residual neural network, so details will not be repeated here.

According to the experimental results, as shown in the specific example of FIG. 6, embedding the four blocks in the same way can strengthen the role of metadata and thus achieve better training results. Specifically, the object image is preprocessed by the preprocessing component 815 to generate the preprocessed image. Then, the preprocessed image is input into a fourth block 814 and converted into a fourth image feature vector. Furthermore, the metadata is input into a fourth embedding network 824 and converted into a fourth embedding feature vector. Then, the fourth image feature vector is fused with the fourth embedding feature vector to generate a fourth fused feature vector, and the fourth fused feature vector is input into the third block 813 and converted into a third image feature vector. Furthermore, the metadata is converted into a third embedding feature vector through a third embedding network 823. Then, the third image feature vector is fused with the third embedding feature vector to generate a third fused feature vector, and the third fused feature vector is further input into a second block 812 and converted into a second image feature vector. Furthermore, the metadata is converted into a second embedding feature vector through a second embedding network 822. Then, the second image feature vector is fused with the second embedding feature vector to generate a second fused feature vector, and the second fused feature vector is further input into the first block 811 and converted into the first image feature vector. Furthermore, the metadata is converted into the first embedding feature vector through the first embedding network 821. In the operation, according to the characteristics of the residual neural network, the dimensions of the fourth embedding feature vector, the third embedding feature vector, the second embedding feature vector, and the first embedding feature vector output by the fourth embedding network 824, the third embedding network 823, the second embedding network 822, and the first embedding network 821 may be respectively 256, 512, 1024, and 2048. In a specific example, the fourth embedding network 824, the third embedding network 823, and the second embedding network 822 may include only one fully connected layer and one linear rectification layer, respectively, while the first embedding network 821 may include three fully connected layers and three linear rectification layers, in which the last fully connected layer outputs a feature vector with a dimension of 2048. Finally, the first image feature vector is fused with the first embedding feature vector to generate the first fused feature vector, and the first fused feature vector is input into the classifier component 830 to generate a classification result.

It may be understood that, in some other embodiments, other blocks may exist between two adjacent blocks receiving the fused feature vector. In addition, other blocks may exist between the preprocessing component and the fourth block, and/or between the first block and the classifier component.

Returning to FIG. 2, in an exemplary embodiment of the disclosure, the training method may further include the following.

In the step S130, when the training accuracy is greater than or equal to the preset accuracy, the training is ended and a trained object recognition model is obtained.

Figure 7:
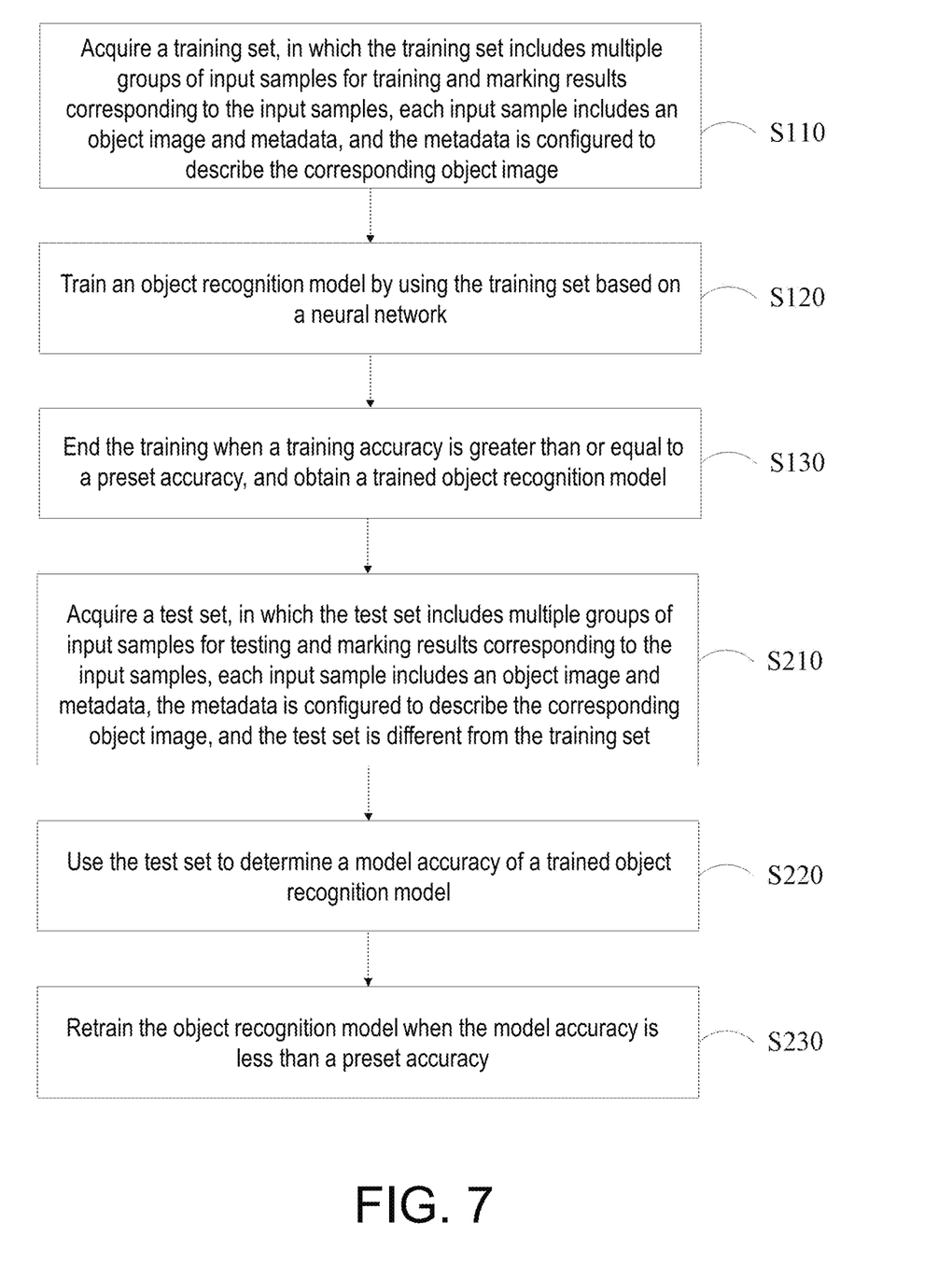
FIG. 7 shows a flow chart of the object recognition model training method according to another exemplary embodiment of the disclosure.

Furthermore, in order to validate the model accuracy of the trained object recognition model, in some embodiments, as shown in FIG. 7, the training method may further include:

In the step S210, a test set is acquired, and the test set includes multiple groups of input samples for testing and marking results corresponding to the input samples. Each input sample includes an object image and metadata. The metadata is configured to describe the corresponding object image. The test set is different from the training set.

In the step S220, the test set is used to determine the model accuracy of the trained object recognition model.

In the step S230, when the model accuracy is less than the preset accuracy, the object recognition model is retrained.

As mentioned above, the input samples in the test set and the training set are not exactly the same, so the test set may be used to test whether the object recognition model has a good recognition effect on object images outside the training set. During the test process, the model accuracy of the object recognition model is calculated by comparing the output results generated based on the object image and the metadata thereof in the test set. In some examples, the model accuracy may be calculated in the same way as the training accuracy. When the model accuracy obtained by the test is less than the preset accuracy, it indicates that the recognition effect of the object recognition model is not good enough, so the training set may be adjusted. Specifically, for example, the number of samples in the training set may be increased, or the object recognition model may be adjusted, or both of the above may be adjusted, and then the object recognition model is retrained to improve the recognition effect.

Figure 8:
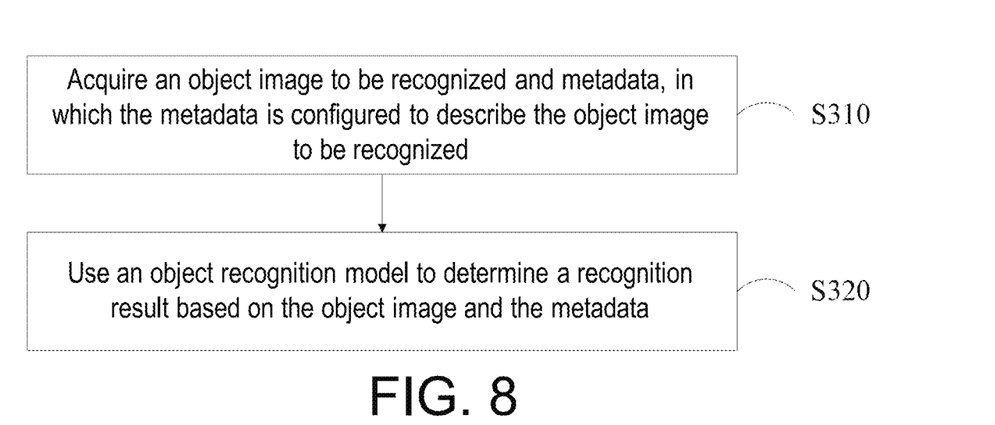
FIG. 8 shows a flow chart of an object recognition method according to an exemplary embodiment of the disclosure.

The disclosure further proposes an object recognition method, as shown in FIG. 8, the object recognition method may include the following.

In the step S310, an object image to be recognized and metadata are acquired, in which the metadata is configured to describe the object image to be recognized.

In the step S320, an object recognition model is used to determine a recognition result based on the object image and the metadata, in which the object recognition model is obtained by training using the training method described above.

Figure 9:
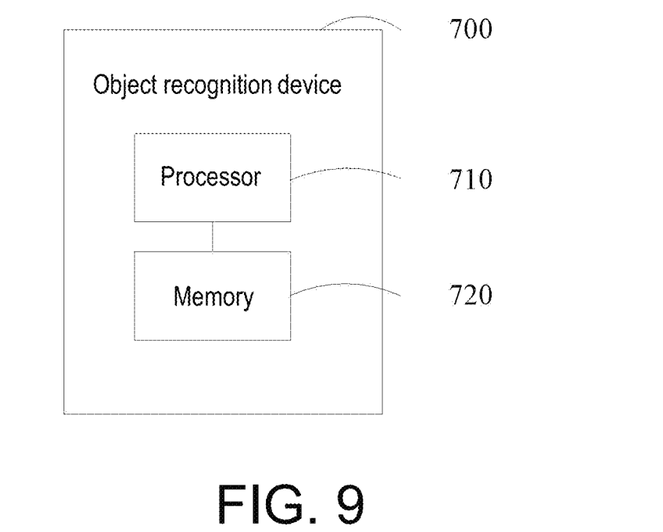
FIG. 9 shows a schematic diagram of an object recognition device according to an exemplary embodiment of the disclosure.

The disclosure further proposes an object recognition device. As shown in FIG. 9, the object recognition device may include a memory 720 and a processor 710. The memory 720 stores a command. When the command is executed by the processor 710, the training method or the object recognition method described above is implemented.

In the embodiment, the processor 710 may perform various actions and processes according to the command stored in the memory 720. Specifically, the processor 710 may be an integrated circuit chip having a signal processing capability. The processor may be a general purpose processor, a digital signal processor (DSP), an application specific integrated circuit (ASIC), a field programmable gate array (FPGA) or other programmable logic device, a discrete gate or transistor logic device, or a discrete hardware component. The various methods, steps, and logic diagrams disclosed in the embodiments of the disclosure may be implemented or executed. The general processor may be a microprocessor or the processor may also be, for example, any conventional processor, and may be, for example, an X86 architecture or an ARM architecture.

The memory 720 stores an executable command, and the command is executed by the processor 710 to perform the object recognition model training method or the object recognition method described above. The memory 720 may be a volatile memory or a nonvolatile memory, or may include both volatile and nonvolatile memory. The nonvolatile memory may be read-only memory (ROM), programmable read-only memory (PROM), erasable programmable read-only memory (EPROM), electrically erasable programmable read-only memory (EEPROM), or flash memory. The volatile memory may be random access memory (RAM), which is used as an external cache. By way of example and not limitation, many forms of RAM are available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronous link dynamic random access memory (SLDRAM), and direct memory bus random access memory (DR RAM). It should be noted that memory of the methods described herein is intended to include, but is not limited to, these and any other suitable types of memory.

The disclosure further provides a computer-readable storage medium, and the computer-readable storage medium stores a command. When the command is executed by the processor, the object recognition model training method or the object recognition method as described above is implemented.

Similarly, the computer-readable storage medium in the embodiments of the disclosure may be a volatile memory or a non-volatile memory, or may include both volatile and non-volatile memory. It should be noted that the computer-readable storage medium described herein is intended to include, but is not limited to, these and any other suitable types of memory.

The disclosure further proposes a computer program product, and the computer program product may include a command. When the command is executed by a processor, the object recognition model training method or the object recognition method as described above is implemented.

The command may be any set of commands to be executed directly, such as machine code, or indirectly, such as a script, by one or more processors. The terms "commands," "application," "process," "steps," and "program" may be used interchangeably herein. The command may be stored in object code format for direct processing by one or more processors, or in any other computer language, including scripts or collections of independent source code modules that are interpreted on demand or compiled ahead of time. The command may include commands that cause one or more processors to act as each neural network in this document. The rest of this document explains the functions, methods, and routines of the command in more detail.

It should be noted that the flowcharts and block diagrams in the accompanying drawings illustrate possible architectures, functions, and operations of systems, methods, and computer program products according to various embodiments of the disclosure. In this regard, each block in the flowchart or block diagram may represent a module, a program segment, or a portion of code, and the module, the program segment, or the portion of code contains one or more executable commands for implementing the specified logical functions. It should also be noted that, in some alternative implementations, the functions noted in the block may occur out of the order noted in the drawings. For example, two blocks shown in succession may actually be executed substantially in parallel, or may sometimes be executed in the reverse order, depending on the functionality involved. It should also be noted that each box in the block diagram and/or flowchart, and combinations of boxes in the block diagram and/or flowchart, may be implemented by a dedicated hardware-based system that performs the specified function or operation, or may be implemented by a combination of dedicated hardware and computer commands.

In general, various exemplary embodiments of the disclosure may be implemented in hardware or special purpose circuits, software, firmware, logic, or any combination thereof. Some aspects may be implemented in hardware, while other aspects may be implemented in firmware or software which may be executed by a controller, microprocessor or other computing device. When aspects of the embodiments of the disclosure are illustrated or described as a block diagram, flow diagram, or using some other graphical representation, it should be understood that the blocks, apparatus, systems, techniques, or methods described herein may be implemented, as non-limiting examples, in hardware, software, firmware, special purpose circuits or logic, general purpose hardware or controllers or other computing devices, or some combination thereof.

The words "front", "back", "top", "bottom", "over", "under" and the like in the description and claims, if present, are used for descriptive purposes and not necessarily for describing invariant relative positions. It is to be understood that the terms so used are interchangeable under appropriate circumstances such that the embodiments of the disclosure described herein are, for example, capable of operation in other orientations than the orientations illustrated or otherwise described herein.

As used herein, the word "exemplary" means "serving as an example, instance, or illustration" rather than as a "model" to be exactly copied. Any implementation described herein as exemplary is not necessarily to be construed as preferred or advantageous over other implementations. Furthermore, the disclosure is not bound by any expressed or implied theory presented in the preceding technical field, background, brief summary, or detailed description.

As used herein, the word "substantially" is meant to include any minor variations caused by design or manufacturing defects, device or component tolerances, environmental influences, and/or other factors. The word "substantially" also allows for deviations from the perfect or ideal case due to parasitic effects, noise, and other practical considerations that may be present in actual implementations.

Additionally, the foregoing description may have referred to elements or nodes or features being "connected" or "coupled" together. As used herein, unless expressly stated otherwise, "connected" means that one element/node/feature is directly connected to (or directly communicates with) another element/node/feature, either electrically, mechanically, logically, or otherwise. Similarly, unless expressly stated otherwise, "coupled" means that one element/node/feature may be directly or indirectly connected to another element/node/feature mechanically, electrically, logically or otherwise to allow interaction, and this is true even though the two features may not be directly connected. In other words, "coupled" is intended to include both direct and indirect connections between elements or other features, including connections through one or more intervening elements.

Additionally, "first," "second," and the like may also be used herein for reference purposes only, and thus are not intended to be limiting. For example, the words "first," "second," and other such numerical words referring to structures or elements do not imply a sequence or order unless clearly indicated by the context.

It should also be understood that when the term "include/comprises" is used in this document, the term indicates the presence of the specified features, integers, steps, operations, units and/or components, but does not exclude the presence or addition of one or more other features, integers, steps, operations, units and/or components and/or combinations thereof.

In the disclosure, the term "provide" is used in a broad sense to cover all ways of obtaining an object, and thus "providing an object" includes but is not limited to, for example, "purchasing", "preparing/manufacturing", "arranging/setting up", "installing/assembling", and/or "ordering" an object.

Although some specific embodiments of the disclosure have been described in detail through examples, persons skilled in the art should understand that the above examples are only for illustration rather than for limiting the scope of the disclosure. The various embodiments disclosed herein may be combined in any manner without departing from the spirit and scope of the disclosure. It should be understood by persons skilled in the art that various modifications may be made to the embodiments without departing from the scope and spirit of the disclosure. The scope of the disclosure is defined by the appended claims.

What is claimed is:

1. A training method of object recognition model, comprising:

acquiring a training set, wherein the training set comprises a plurality of groups of input samples for training and marking results corresponding to the input samples, each of the input samples comprises an object image and metadata, and the metadata is configured to describe the corresponding object image;
training the object recognition model by using the training set based on a neural network; and
ending training in response to a training accuracy being greater than or equal to a preset accuracy, and obtaining a trained object recognition model,
wherein training the object recognition model by using the training set based on the neural network comprises:
generating a first image feature vector based on the object image;
generating a first embedding feature vector based on the metadata;
adding each image vector component in the first image feature vector to a corresponding embedding vector component in the first embedding feature vector to generate each fused vector component in a first fused feature vector; and
generating a classification result according to the first fused feature vector to train the object recognition model.

2. The training method according to claim 1, wherein before training the object recognition model by using the training set based on the neural network, the training method further comprises:
normalizing the metadata.

3. The training method according to claim 1, wherein the metadata comprises at least one of a geographical shooting location, a shooting time, a shooting scene, an object part, and an object state of the object image.

4. The training method according to claim 1, wherein the neural network comprises a classifier component and at least one block, the at least one block comprises a first block, and
the first block is configured to generate the first image feature vector based on the object image,
the classifier component is configured to generate the classification result according to the first fused feature vector.

5. The training method according to claim 1, wherein generating the first embedding feature vector based on the metadata comprises:
generating the first embedding feature vector based on the metadata through at least one fully connected layer.

6. The training method according to claim 1, wherein generating the first embedding feature vector based on the metadata comprises:
generating the first embedding feature vector based on the metadata through at least one fully connected layer and at least one linear rectification layer.

7. The training method according to claim 1, wherein a dimension of the first image feature vector is same as a dimension of the first embedding feature vector.

8. The training method according to claim 4, wherein the at least one block further comprises a second block connected in series with the first block, and
generating the first image feature vector based on the object image through the first block comprises:
generating a second image feature vector based on the object image through the second block;
generating a second embedding feature vector based on the metadata;
fusing the second image feature vector with the second embedding feature vector to generate a second fused feature vector; and
generating the first image feature vector according to the second fused feature vector through the first block.

9. The training method according to claim 4, wherein the neural network further comprises a preprocessing component, and
training the object recognition model by using the training set based on the neural network comprises:
generating a preprocessed image based on the object image through the preprocessing component, and using the preprocessed image as an input of a block adjacent to the preprocessing component in the at least one block.

10. The training method according to claim 1, wherein the training method further comprises:
acquiring a test set, wherein the test set comprises a plurality of groups of input samples for testing and marking results corresponding to the input samples, each of the input samples comprises an object image and metadata, the metadata is configured to describe the corresponding object image, and the test set is different from the training set;
using the test set to determine a model accuracy of the trained object recognition model; and
retraining the object recognition model in response to the model accuracy being less than the preset accuracy.

11. The training method according to claim 1, wherein the neural network comprises a residual neural network.

12. An object recognition method, comprising:
acquiring an object image to be recognized and metadata, wherein the metadata is configured to describe the object image to be recognized;
determining a recognition result based on the object image and the metadata by using an object recognition model, wherein the object recognition model is obtained by training using the training method according to claim 1.

13. An object recognition device, wherein the object recognition device comprises a memory and a processor, the memory stores a command, and in response to the command being executed by the processor, the training method according to claim 1 is implemented.

14. A computer-readable storage medium, wherein the computer-readable storage medium stores a command, and in response to the command being executed by a processor, the training method according to claim 1 is implemented.

15. A computer program product, wherein the computer program product comprises a command, and in response to the command being executed by a processor, the training method according to claim 1 is implemented.

16. An object recognition device, wherein the object recognition device comprises a memory and a processor, the memory stores a command, and in response to the command being executed by the processor, the object recognition method according to claim 12 is implemented.

17. A computer-readable storage medium, wherein the computer-readable storage medium stores a command, and in response to the command being executed by a processor, the object recognition method according to claim 12 is implemented.

18. A computer program product, wherein the computer program product comprises a command, and in response to the command being executed by a processor, the object recognition method according to claim 12 is implemented.

* * * * *